United States Patent [19]

Mallikarjun

[11] Patent Number: 5,212,239
[45] Date of Patent: May 18, 1993

[54] RESIN BLENDS CONTAINING CRYSTALLINE PROPYLENE POLYMERS AND STYRENIC COPOLYMERS

[75] Inventor: Ramesh Mallikarjun, Exton, Pa.

[73] Assignee: Arco Chemical Technology, L.P., Wilmington, Del.

[21] Appl. No.: 659,802

[22] Filed: Feb. 22, 1991

[51] Int. Cl.⁵ .................. C08G 63/48; C08G 63/91; C08L 53/00
[52] U.S. Cl. ......................... 525/74; 525/96
[58] Field of Search .................... 525/74, 96

[56] References Cited

U.S. PATENT DOCUMENTS

| | | | |
|---|---|---|---|
| 4,386,187 | 3/1983 | Grancio et al. | 525/96 |
| 4,386,188 | 3/1983 | Grancio et al. | 525/96 |
| 4,582,871 | 4/1986 | Noro et al. | 524/413 |
| 4,721,752 | 1/1988 | Schepers et al. | 525/74 |
| 4,742,116 | 5/1988 | Schepers et al. | 525/74 |
| 4,968,747 | 11/1990 | Mallikarjun | 525/74 |
| 5,055,527 | 10/1991 | Bronstert et al. | 525/207 |
| 5,118,761 | 6/1992 | Dharmarajan et al. | 525/210 |
| 5,159,025 | 10/1992 | Terada | 525/327.6 |

FOREIGN PATENT DOCUMENTS

| | | |
|---|---|---|
| 82-65745 | 4/1982 | Japan . |
| 59-66444 | 4/1984 | Japan . |
| 86-34037 | 2/1986 | Japan . |
| 63-205341 | 8/1988 | Japan . |

OTHER PUBLICATIONS

Bartlett et al., Modern Plastics, Dec. 1981, p. 60.

*Primary Examiner*—John Kight, III
*Assistant Examiner*—T. Mosley
*Attorney, Agent, or Firm*—Stephen D. Harper

[57] ABSTRACT

Resin blends having improved toughness and resistance to heat deformation are obtained by blending crystalline propylene polymers, random thermoplastic styrenic copolymers containing $\alpha,\beta$-unsaturated dicarboxylic acid anhydride, and amino- or hydroxy-functionalized elastomers. The amino- or hydroxy-functionalized elastomers may be formed in situ by the reaction of anhydride-functionalized elastomers and linking compounds having at least two active-hydrogen containing functional groups such as amino or hydroxyl.

20 Claims, No Drawings

RESIN BLENDS CONTAINING CRYSTALLINE PROPYLENE POLYMERS AND STYRENIC COPOLYMERS

FIELD OF THE INVENTION

This invention is directed to compatibilized polyblends of crystalline propylene polymers, random styrenic copolymers, and functionalized elastomers comprised of base elastomeric polymers and pendent active hydrogen-containing functional groups selected from amino and hydroxyl.

BACKGROUND OF THE INVENTION

Crystalline propylene polymers have been widely used for a number of years as low cost thermoplastic resins in the production of fibers, coatings, containers, pipes, and the like. Propylene homopolymer is typically about 60 to 70 percent crystalline and consequently has good chemical resistance to hydrocarbons, alcohols, acids, and alkalies. To improve the toughness, however, propylene is commonly copolymerized with minor amounts of ethylene. The resulting decrease in crystallinity significantly lowers the melting point and heat resistance of the polymer. Fillers and reinforcements are often added to increase the stiffness and heat resistance and to reduce part shrinkage or warpage. The presence of such additives adversely affects the impact properties of the polymer. Thus, it is apparent there is a need for polypropylene-based resins having physical properties which are sufficiently improved such that they are suitable for use as engineering resins.

Propylene polymers have been blended with a variety of other polymers for the purpose of obtaining blends having properties superior to those of polypropylene. Since polypropylene is immiscible with most other polymers, however, it has typically been necessary to use a third polymer as a compatibilizer.

For example, U.S. Pat. Nos. 4,386,187 and 4,386,188 teach thermoformable polymer blend compositions comprising an olefin polymer (e.g., polypropylene), a styrene polymer, and a styrenic block copolymer rubber compatibilizer.

Bartlett et al (*Mod. Plastics* December 1981, p. 60) teach the use of hydrogenated styrene/butadiene block copolymers as compatibilizers for blends of general purpose polystyrene and polypropylene.

U.S. Pat. No. 4,582,871 discloses thermoplastic resin compositions comprising a propylene polymer, a styrene polymer, a styrenic block copolymer rubber compatibilizer, and an inorganic filler.

Jpn. Pat. No. 63-205341 teaches resin blends comprised of low molecular weight polypropylene, a styrene/maleic anhydride copolymer, and a styrenic block copolymer rubber compatibilizer.

Jpn. Pat. No. 59-66,444 discloses blends of polypropylene, an ethylene/glycidyl methacrylate/vinyl acetate terpolymer, and a graft polymer of ethylene-propylene-diene monomer rubber graft-polymerized with a mixture of styrene and acrylonitrile.

Jpn. Pat. No. 86-34037 teaches the modification of polypropylene with an epoxy group-containing olefinic copolymer such as an ethylene/glycidyl methacrylate copolymer.

U.S. Pat. No. 4,968,747 describes compatibilized blends of crystalline propylene polymers and styrenic copolymers wherein an epoxy group-containing copolymer is used as a compatibilizer.

Despite the advances which have been made in recent years with respect to blends of polypropylene and styrenic copolymers, it is apparent there exists a need for improved blends of this type whereby the compatibility of the blends is enhanced in order to simultaneously obtain better impact properties and heat resistance.

SUMMARY OF THE INVENTION

This invention provides a resin blend comprising (a) from about 25 to 80 weight percent of a crystalline propylene polymer, (b) from about 5 to 40 weight percent of a random styrenic copolymer of (i) from about 50 to 99.5 weight percent of a vinyl aromatic monomer, (ii) from about 0.5 to 30 weight percent of a first $\alpha,\beta$-unsaturated dicarboxylic acid anhydride, and (iii) optionally, up to about 40 weight percent of a copolymerizable ethylenically unsaturated monomer selected from the group consisting of unsaturated nitriles, unsaturated carboxylic acids, unsaturated carboxylic acid esters, unsaturated dicarboxylic acid imides, and mixtures thereof, (c) from about 2 to 40 weight percent of a functionalized elastomer comprised of a base elastomeric polymer and at least one pendent active hydrogen-containing functional group selected from the group consisting of amino and hydroxyl wherein said base elastomeric polymer is selected from the group consisting of (i) random copolymers of ethylene, a $C_3$ to $C_6$ olefin, and, optionally, a diene;
(ii) conjugated diene polymers and hydrogenated derivatives thereof; and
(iii) block and random copolymers of vinyl aromatic monomers and conjugated dienes and hydrogenated derivatives thereof.

In a preferred embodiment of the invention, the functionalized elastomer is derived by reacting an anhydride-functionalized elastomer which is an adduct of the base elastomeric polymer and a second $\alpha,\beta$-unsaturated dicarboxylic acid anhydride with a linking compound having at least two active hydrogen-containing functional groups selected from the group consisting of hydroxyl and amino.

The resin blends of this invention are tough rigid thermoplastic compositions having fine dispersion microstructures observable by electron microscopy. The compositions of the continuous and disperse phases depend on the relative amounts of the various components employed. The disperse phase when viewed by electron microscopy appears as particles of extremely small average diameter. It is preferred that the average diameter of the disperse phase particles be as small as possible, with the preferred diameter being less than about 5 microns. Most preferably, the particle diameter is less than about 2 microns. The particle size of the disperse phase is much smaller than would be expected from the large difference in solubility parameters between the individual components of the polyblend.

Without wishing to be bound by any particular theory, it is believed that the enhanced compatibilization of the crystalline propylene polymer and the styrenic copolymer observed in the resin blends of this invention is achieved by chemical reaction of the active hydrogen-containing functional groups of the linking compound with the anhydride groups present in both the anhydride-functionalized elastomer and the styrenic copolymer. As a result of the enhanced compatibilization, the resin blends possess an excellent overall balance of properties including superior toughness, resistance to heat sag, and reduced tendency towards delamination.

The interaction of the linking compound and the anhydride-functionalized elastomer is thought to form an amine- or hydroxy-functionalized elastomer in situ during the blending process. Thus, any other analogous base elastomeric polymer which has grafted onto it compounds containing hydroxyl or amino groups or is modified or otherwise synthesized so as to incorporate pendent hydroxyl or amino groups may also be used in blends of crystalline propylene polymers and random styrenic copolymers of the type herein described.

DETAILED DESCRIPTION OF THE INVENTION

A. Crystalline Propylene Polymer

The thermoplastic resin compositions of this invention contain from about 25 to 80 weight percent, preferably from about 40 to 70 weight percent, of a crystalline propylene polymer. The crystalline propylene polymer may be either a homopolymer of propylene or a copolymer of a propylene with a minor amount (preferably, from about 1 to 20 weight percent) of another olefin such as ethylene, 1-butene, 4-methyl-1-pentene, 1-hexene, 1-octene, and the like. Block, random, or mixed block/random copolymers may be employed. The apparent crystalline melting point of the crystalline propylene polymer is preferably from about 140 to 180° C; it is not necessary for this component to be completely crystalline (i.e., 100% isotactic). The number average molecular weight of the crystalline propylene polymer is preferably above about 10,000 and more preferably is greater than about 50,000. The melt flow rate should be less than 15 g/10 minutes (Condition L) and preferably is less than 12 g/10 minutes. In contrast to the blends described in Japanese Pat. 63-205341, the use of low molecular weight propylene polymers is not required in order to obtain good moldability, processability, and surface appearance. Preferably, the crystalline propylene polymer is a crystalline propylene homopolymer, a crystalline propylene-ethylene copolymer, or a mixture of these resins. The ethylene content of the copolymer is preferably from about 1 to 20 weight percent.

Methods of preparing the crystalline propylene polymers described above are well-known in the art. General descriptions of such methods may be found, for example, in "Propylene Polymers" *Encyclopedia of Polymer Science and Engineering* 2nd Ed., Wiley-Interscience, Vol. 13, pp. 464–530(1988) and "Olefin Polymers" *Kirk-Othmer Encyclopedia of Chemical Technology* 3rd Ed., Wiley-Interscience, Vol. 16, pp. 385–479(1981). The teachings of these reviews are incorporated herein by reference.

Illustrative examples of suitable commercially available crystalline propylene polymers include "NORCHEM NPP8006-GF" (a general purpose propylene homopolymer sold by Quantum Chemical Corp.), "ESCORENE 1052" (a general purpose propylene homopolymer sold by Exxon Chemical Co.), "Pro-Fax 6323" (a general purpose propylene homopolymer sold by Himont U.S.A., Inc.) and "TENITE P64MZ-007" (a propylene copolymer sold by Eastman).

If desired, an impact-modified crystalline propylene polymer may also be used in the polyblend compositions of this invention. The propylene polymer may be rubber-toughened by blending with any of a number of elastomers such as styrene-butadiene rubber (SBR), ethylene-propylene-diene rubber (EPDM), ethylene-propylene rubber (EPR), polybutadiene, thermoplastic rubbers such as styrene/butadiene block copolymers and hydrogenated styrene/butadiene block copolymers, natural rubber, polyisobutylene, and polyethylene.

B. Random Styrenic Copolymer

The resin blend compositions of this invention additionally are comprised of from about 10 to 40 (more preferably, from about 15 to 30) weight percent of a random styrenic copolymer. The random styrenic copolymer is a copolymer of from about 50 to 99.5 weight percent of a vinyl aromatic monomer, from about 0.5 to 30 weight percent of an $\alpha,\beta$-unsaturated dicarboxylic acid anhydride, and, optionally, up to about 40 weight percent of a copolymerizable ethylenically unsaturated monomer. It is preferred that the random styrenic copolymer be comprised of from about 70 to 99 weight percent vinyl aromatic monomer and from about 1 to 30 weight percent unsaturated dicarboxylic acid anhydride. Most preferably, the amount of anhydride is relatively low (i.e., from about 1 to 10 weight percent).

Although any suitable vinyl aromatic monomer may be employed in the random styrenic copolymer, styrene is the preferred monomer because of its low cost and availability. Examples of other vinyl aromatic monomers which can be used include, but are not limited to, ar-methyl styrene, ar-ethyl styrene, ar-tert-butyl styrene, ar-chloro styrene, alpha-methyl styrene, divinyl benzene, vinyl benzyl chloride, and vinyl naphthalene, as well as other alkyl- or halo-substituted styrenes. Mixtures of vinyl aromatic monomers can be used.

Unsaturated dicarboxylic acid anhydrides suitable for inclusion in the styrenic copolymer component include those organic compounds which are polymerizable under free radical conditions and which have a carbon-carbon double bond in conjugation with a carbon-oxygen double bond. Exemplary unsaturated dicarboxylic acid anhydrides include itaconic anhydride, citraconic anhydride, ethyl maleic anhydride, methyl itaconic anhydride, chloromaleic anhydride, bromomaleic anhydride, tetrahydrophthalic anhydride, and, most preferably, maleic anhydride. If desired, mixtures of $\alpha,\beta$-unsaturated dicarboxylic acid derivatives can be used.

The optional copolymerizable ethylenically unsaturated monomer may be selected from the group consisting of unsaturated nitriles (e.g., acrylonitrile and methacrylonitrile), unsaturated carboxylic acids (e.g., acrylic acid and methacrylic acid), unsaturated carboxylic acid esters (especially $C_1$-$C_4$ alkyl esters such as methyl methacrylate and ethyl acrylate), unsaturated dicarboxylic acid imides (e.g., maleimide, N-phenylmaleimide) and mixtures thereof. Terpolymers of styrene, maleic anhydride, and acrylonitrile or styrene, maleic anhydride, and methyl methacrylate are particularly preferred.

In the most preferred embodiment of this invention, the random styrenic copolymer is a copolymer of styrene and maleic anhydride. The random styrenic copolymer preferably has a number average molecular weight of from about 30,000 to 500,000 and a melt flow rate (Condition L) of from about 0.1 to 10 g/10 min.

Rubber-modified random styrenic copolymers may also be employed. Such copolymers preferably contain from about 1 to 35 (more preferably, from about 5 to 25)

weight percent of a grafted and/or blended rubber. The grafted or blended rubber is preferably selected from the group consisting of conjugated diene rubbers and ethylene-propylene-diene monomer rubbers.

Conjugated diene rubbers suitable for use as the grafted or blended rubber preferably contain at least about 50 weight percent of a conjugated diene and have glass transition temperatures less than about 0° C. (more preferably, less than about −20° C.). Such rubbers include homopolymers, random copolymers, and block copolymers of conjugated 1,3-dienes such as 1,3-butadiene (a preferred diene), isoprene, chloroprene, 1,3-pentadiene, 2,3-dimethyl-1,3-butadiene, and the like. The conjugated diene rubber is preferably selected from the group consisting of mono-vinyl aromatic monomer/conjugated diene block copolymers, mono-vinyl aromatic monomer/conjugated diene random copolymers, conjugated diene homopolymers, and mixtures thereof.

The conjugated diene rubber may contain one or more copolymerizable ethylenically unsaturated comonomers. Most preferably, the comonomer is a monovinyl aromatic monomer such as styrene, ar-methyl styrene, ar-ethyl styrene, ar-tert-butyl styrene, ar-chlorostyrene, alpha-methyl styrene, vinyl benzyl chloride, vinyl naphthalene, and the like and mixtures thereof. Other copolymerizable ethylenically unsaturated monomers may be employed, however, including unsaturated nitrile monomers such as acrylonitrile and methacrylonitrile, alkyl acrylates such as methyl methacrylate, methyl acrylate, butyl acrylate, or 2-ethylhexyl methacrylate, acrylamides such as acrylamide, methacrylamide, or butylacrylamide, unsaturated ketones such as vinyl methyl ketone or methyl isopropenyl ketone, α-olefins such as ethylene or propylene, vinyl esters such as vinyl acetate or vinyl stearate, vinyl heterocyclic monomers such as vinyl pyridine, vinyl and vinylidene halides such as vinyl chloride or vinylidene chloride, and the like and mixtures thereof. In a preferred embodiment of this invention, the comonomer used in combination with the 1,3-conjugated diene is the same as the vinyl aromatic monomer component of the random styrenic copolymer.

Exemplary conjugated diene rubbers suitable for rubber modifying the random thermoplastic copolymer include styrene/butadiene and styrene/isoprene block copolymers. Such block copolymers may be linear, radial, or branched in structure. Linear block copolymers may have an ABA, AB(AB)$_n$A, (AB)$_n$, or similar structure wherein A represents a block of the mono-vinyl aromatic monomer, B represents a block of the conjugated diene and n is an integer of 1 to 10. Radial block copolymers may have an (AB)$_n$ X structure, wherein X is a multi-valent linking agent. Block copolymers of these types are well-known. Details concerning their preparation, structure, and properties may be found, for example, in the following references: "Styrene-Diene Block Copolymers" *Encyclopedia of Polymer Science and Technology* 1st Ed., Wiley, Suppl., pp 508–530(1971), K. E. Snavely et al, *Rubber World* 169, 45(1973), and "Thermoplastic Elastomers" *Kirk-Othmer Encyclopedia of Chemical Technology* 3rd., Vol. 8, Wiley-Interscience, pp 627–632(1981).

The following U.S. patents, incorporated herein by reference, further describe such block copolymer conjugated diene rubbers: U.S. Pat. Nos. 3,937,760, 3,231,635, 3,265,765, 3,198,774, 3,078,254, 3,244,644, 3,280,084, 3,954,452, 3,766,301, 3,281,383, 4,640,968, 4,503,188, 4,485,210, 4,390,663, 4,271,661, and 4,346,193. Suitable block copolymers are also presently available from commercial sources. Examples of commercially available block copolymer rubbers include "STEREON 840A" (a linear graded styrene/butadiene multi-block copolymer containing about 43% styrene and having a number average molecular weight of about 60,000, sold by Firestone Synthetic Rubber and Latex Co.), "STEREON 730A" (a stereospecific tapered styrene/butadiene block copolymer containing a total of 30% styrene with 21% styrene in block form and having a number average molecular weight of 140,000, sold by Firestone Synthetic Rubber and Latex Company), "KRATON D-1101" (a linear styrene/butadiene/styrene triblock copolymer containing 31% styrene, sold by Shell Chemical), "KRATON D-1107" (a linear styrene/isoprene/styrene triblock copolymer containing 14% styrene, sold by Shell Chemical), and "KRATON D-1184" (a branched styrene/butadiene multiblock copolymer containing 30% styrene, sold by Shell Chemical).

Also suitable for use as conjugated diene rubbers in the rubber-modified styrenic copolymer component of this invention are random copolymers of mono-vinyl aromatic monomers and conjugated dienes. A particularly preferred conjugated diene rubber of this type is styrene/butadiene rubber (SBR). Homopolymers of conjugated dienes such as polybutadiene and polyisoprene may also be employed as the rubber. All such rubbers are well-known in the art and are described, for example, in "Butadiene Polymers" *Encyclopedia of Polymer Science and Engineering* 2nd Ed., Wiley-Interscience, Vol. 2, pp. 537– 590(1988), the teachings of which are incorporated by reference herein in their entirety.

The grafted or blended rubber may alternatively be an ethylene propylene diene monomer (EPDM) rubber. Such materials are well-known in the art and are random copolymers of ethylene, at least one $C_3$–$C_6$ α-olefin (preferably propylene), and at least one nonconjugated diene. The nonconjugated diene may be a linear aliphatic diene of at least six carbon atoms which has either two terminal double bonds or one terminal double bond and one internal double bond. Alternatively, the nonconjugated diene may be a cyclic diene where one or both of the double bonds are part of a carboxcyclic ring. The structure of the EPDM rubber may be altered as desired, particularly with respect to branching, by the selection of particular nonconjugated dienes as is well known in the art. Particularly preferred nonconjugated dienes include 1,4-hexadiene, dicyclopentadiene, vinyl norbornene, norbornadiene, and 5-ethylidene-2-norbornene. Preferably, the EPDM rubber contains from about 40 to 90 mole percent ethylene and 0.1 to 7.5 mole percent nonconjugated diene, with the remainder being propylene. Additional information regarding EPDM rubbers may be found in "Ethylene-Propylene Elastomers" *Encyclopedia of Polymer Science and Engineering* 2nd Ed., Wiley-Interscience, Vol. 6, p. 522–564(1986), the teachings of which are incorporated herein by reference.

The random styrenic copolymers useful in the compositions of this invention may be prepared by any of the several methods available for their synthesis. For example, the copolymers may be obtained by solution copolymerization directly from the respective monomers by the incremental addition of the more reactive monomer as taught by U.S. Pat. No. 2,971,939 or by a continuous recycle polymerization process described in U.S. Pat. Nos. 2,769,804 and 2,989,517. Alternatively, a suspension polymerization process as taught in U.S. Pat. No. 3,509,110 may be employed. Rubber-modified random styrenic copolymers may be prepared by incorporation of the rubber into the monomer mixture prior to polymerization using, for example, the methods of U.S. Pat. Nos. 4,097,551 and 3,919,354. The teachings of all these patents are incorporated herein by reference. Suitable commercially available random styrenic copolymers include the "Dylark" styrene/maleic anhydride resins produced by ARCO Chemical Company.

C. Anhydride-Functionalized Elastomer

The anhydride-functionalized elastomer may constitute from about 2 to 40 weight percent of the total resin blend of the invention, with 15 to 35 weight percent being the preferred range.

The anhydride-functionalized elastomers suitable for use in the moldable polyblends of this invention are relatively soft, rubber-like polymers containing at least one pendent carboxylic acid anhydride group per polymer chain which provides a potential grafting site for reaction with a linking compound having active hydrogen-containing functional groups. The anhydride group is preferably pendent and not incorporated as a monomer unit in the backbone of the elastomeric polymer. As applied in the context of this invention, the terms "elastomeric" or "elastomer" are defined as meaning a polymeric material which either in an uncured or cross-linked state at room temperature can be stretched under low stress to at least twice its original length and, upon immediate release of the stress, will return with force to its approximate original length. The anhydride-functionalized elastomer should have a glass transition temperature less than 0° C.; more preferably, the glass transition temperature should be less than $-40°$ C. The molecular weight of the anhydride-functionalized elastomer should be sufficiently high so as to provide adequate elastomeric properties. Solid anhydride-functionalized elastomers are preferred. In most instances, the number average molecular weight will preferably be above about 30,000. The anhydride-functionalized elastomers should contain a minimum of cross-linking or gel in order to facilitate processing of the resin blends of this invention. Some degree of branching may be desirable, however.

The $\alpha,\beta$-unsaturated carboxylic acid anhydrides suitable for use in preparing the adducts to be used in the polyblends of this invention are those anhydrides which may be reacted into the random copolymer to provide hydroxy- or amine-reactive functional groups. A particularly preferred anhydride is maleic anhydride, although other $\alpha,\beta$-unsaturated dicarboxylic acid anhydrides may also be employed. For example, itaconic anhydride, citraconic anhydride, chloromaleic anhydride, and tetraphthalic anhydride are all suitable for use.

The amount of anhydride in the functionalized elastomer is critical with respect to obtaining optimum physical and mechanical properties in the polyblends of this invention. If the amount of anhydride is too low, insufficient interaction between the components of the blend will take place. For example, the use of an unfunctionalized elastomer will yield a blend having relatively poor impact strength. If the amount of anhydride is too high, excessive cross-linking will tend to occur resulting in a brittle, difficultly processed mixture. For these reasons, it is desirable that the adduct (i.e., the anhydride-functionalized elastomer) contain from about 0.1 to 5 weight percent anhydride. Most preferably, the adduct contains from about 0.5 to 2 weight percent maleic anhydride.

To accomplish good compatibilization of the blend components, (i) random copolymers of ethylene, a $C_3$ to $C_6$ olefin, and, optionally, a diene, (ii) conjugated diene polymers and hydrogenated derivatives thereof, and (iii) block and random copolymers of vinyl aromatic monomers and conjugated dienes and hydrogenated derivatives thereof. Elastomeric polymers of this type and $\alpha,\beta$-unsaturated dicarboxylic acid anhydride adducts of such elastomeric polymers are well known in the art and may be prepared by any suitable method or obtained from commercial sources.

In one preferred embodiment, the functionalized elastomer may be an adduct of an $\alpha,\beta$-unsaturated carboxylic acid anhydride and a random copolymer of ethylene, at least one $C_3$ to $C_6$ $\alpha$-olefin, and at least one diene. The diene may be a conjugated diene or, more preferably, a non-conjugated diene. This type of random terpolymer is the type generally referred to in the art as "EPDM" rubber. The $\alpha$-olefin is preferably propylene, for reasons of availability, but may also be 1-butene, 1-pentene, 1-hexene or mixtures thereof. The nonconjugated diene suitable for use in preparing the random copolymer may be a linear aliphatic diene of at least six carbon atoms which has either two terminal double bonds or one terminal double bond and one internal double bond. Alternatively, the nonconjugated diene may be a cyclic diene wherein one or both of the double bonds are part of a carboxcyclic ring. The structure of the copolymer may be altered as desired, particularly with respect to branching, by the selection of particular nonconjugated dienes as is well known to those skilled in the art. Particularly preferred nonconjugated dienes include 1,4-hexadiene, dicyclopentadiene, and 5-ethylidene-2-norbornene.

In this embodiment, it is preferred that the random copolymer contain from about 40 to 90 mole percent ethylene and 0.1 to 7.5 mole percent nonconjugated diene, with the remainder being propylene.

The adducts of $\alpha,\beta$-unsaturated carboxylic acid anhydrides and random copolymers of ethylene, at least one $C_3$ to $C_6$ $\alpha$-olefin, and at least one nonconjugated diene which are suitable for use in the polyblends of this invention may be prepared by any of the methods well-known to those skilled in the art. U.S. Pat. Nos. 3,884,882, 4,174,358, and 4,010,223, incorporated herein by reference, teach the preparation of such adducts by reacting maleic anhydride and EPDM type rubbers. EP 353,720, incorporated herein by reference, teaches the use of certain metal catalysts in the preparation of such adducts. Examples of suitable functionalized elastomers of this type are Uniroyal "ROYALTUF 465" and Uniroyal "ROYALTUF 465A", which are maleated-EPDM rubbers containing about 1.2 and 0.7 weight percent maleic anhydride.

In another embodiment of this invention, the functionalized elastomer is an adduct of an $\alpha,\beta$-unsaturated dicarboxylic acid anhydride and a random copolymer of ethylene and at least one $C_3$ to $C_6$ $\alpha$-olefin. The $\alpha$-olefin is most preferably propylene, but may also be 1-butene, 1-pentene, 1-hexene or mixtures thereof. Random copolymers of this type are available commercially and are generally referred to as "EP" rubbers. Methods of preparing ethylene-propylene rubbers are well known in the art and are described, for example, in ver Strate, "Ethylene-Propylene Elastomers", *Encyclopedia of Polymer Science and Technology*, Vol. 6, Wiley-Interscience (1988), pp. 522–564 (the teachings of which are incorporated herein by reference). The random copolymers of ethylene and at least one $C_3$ to $C_6$ α-olefin advantageously contain from about 10 to 80 mole percent propylene, although it is preferred that the propylene content be from about 25 to 75 mole percent. To form the anhydride-functionalized elastomer, an α,β-unsaturated dicarboxylic acid anhydride can be reacted with the random copolymer using any appropriate method. Preparative procedures of this type are described, for example, in Jpn., Kokai No. 66249/88, U.S. Pat. Nos. 4,134,927 and 3,236,917, and Cimmino et al., *Polymer Eng. Sci.* 24, 48 (1984), the teachings of which are incorporated by reference in their entirety.

In another embodiment, the functionalized elastomer is an adduct of an α,β-unsaturated carboxylic acid anhydride and a block copolymer containing at least one block consisting essentially of recurring units of at least one monovinyl aromatic monomer and at least one other block consisting essentially of recurring units of a conjugated diene. The monovinyl aromatic monomer is most preferably styrene, but may be any other similar monomer such as α-methylstyrene, p-methylstyrene, p-ethylstyrene, p-tert-butyl styrene or p-chlorostyrene. Suitable conjugated dienes include butadiene and isoprene. Multiblock copolymers may be utilized having structures represented by the formulae A—B, A—B—A, B—A—B, A—B—A—B, $(A—B)_x$, wherein X is an integer of 1 to 20 and wherein A is the monovinyl aromatic monomer block and B is a conjugated diene block. Graded, tapered, star, and radial blocks may be similarly employed.

The 1,2-microstructure content of the conjugated diene block may be from about 7 to 100%. The block copolymer preferably contains up to 60 percent by weight of monovinyl aromatic monomer; higher monovinyl aromatic monomer content may yield block copolymers which are not sufficiently elastomeric for the purposes of this invention.

The block copolymer may be hydrogenated in order to reduce the level of unsaturation due to the conjugated diene block(s). Preferably, the level of unsaturation is reduced to less than 20 percent of the original value before hydrogenation. The low levels of unsaturation provide the final polyblend with a higher degree of resistance toward oxidative degradation.

The blocks of recurring monovinyl aromatic monomer units constitute relatively hard segments having a glass transition temperature or melting temperature about ambient while the blocks of conjugated diene ar relatively soft rubbery segments having glass transition temperatures below ambient. The block copolymer is thus a thermoplastic elastomer.

The adducts of α,β-unsaturated carboxylic acid anhydrides and block copolymers of monovinyl aromatic compounds and conjugated dienes suitable for use as functionalized elastomers in the polyblends of this invention may be prepared by any of the methods known in the art. U.S. Pat. No. 4,427,828, incorporated herein by reference, teaches the preparation of such adducts by thermally grafting the anhydride onto a hydrogenated block copolymer using an "ene"-type reaction. U.S. Pat. No. 4,578,429, incorporated herein by reference, teaches that similar adducts may also be obtained by free radical induced grafting. In this method, the resulting adducts are more thermally stable than the adducts of U.S. Pat. No. 4,427,828 due to the type of grafting which occurs. In addition, the functionalized hydrogenated block copolymers produced by free radical grafting may contain even lower levels of unsaturation since the presence of double bonds in the block copolymer is not required by this type of grafting mechanism. "KRATON FG1901X", a maleated block copolymer sold commercially by Shell which contains ca. 2 wt. % maleic anhydride, is an example of a suitable functionalized elastomer of this type. Such materials are sometimes referred to as functionalized styrene-ethylene/1-butene-styrene (S-E/B-S) rubbers, as the structure of the butadiene center block after hydrogenation resembles that of an ethylene/1-butene copolymer. Processes for the preparation of adducts of unsaturated anhydrides and unhydrogenated block copolymers of aromatic vinyl compound and conjugated diene compounds are described in U.S. Pat. No. 4,292,414, the teachings of which are incorporated herein by reference.

In another embodiment of this invention, the functionalized elastomer is an adduct of an α,β-unsaturated carboxylic acid anhydride and a random copolymer of at least one monovinyl aromatic monomer or unsaturated nitrile and at least one conjugated diene. The random copolymer may be hydrogenated if improved oxidative resistance is desired. Styrene is the preferred monovinyl aromatic monomer and preferably does not represent more than about 60 mole percent of the random copolymer in order that the glass transition temperature not be increased past the point at which the random copolymer would no longer function effectively as an elastomer. Other monovinyl aromatic monomers may be employed, however, including α-methyl styrene, o- or p-methylstyrene, p-tert-butylstyrene, p-chlorostyrene, vinyl naphthalene, and the like or mixtures thereof. Suitable unsaturated nitriles include, for example, acrylonitrile and methacrylonitrile. The copolymer may contain both a monovinyl aromatic monomer and an unsaturated nitrile, if desired. Suitable conjugated dienes include 1,3-butadiene, isoprene, 1,3-pentadiene, 2,3-dimethyl-1,3-butadiene and similar compounds, with 1,3-butadiene being the preferred diene. The 1,2-microstructure content of the random copolymers can vary from about 10 to 100 percent. The random copolymer may be hydrogenated if desired to lower the unsaturation level to less than 20 percent of the original value; the oxidative resistance of the resulting polymer blends will thereby be improved.

The preparation of adducts of this type is taught in U.S. Pat. No. 4,427,828, which teaches that random copolymers of conjugated dienes and monovinyl aromatic monomers may be functionalized with α,β-unsaturated carboxylic acid anhydrides in a thermal "ene-type" reaction. Jpn. Kokai No. 66249/88 describes the synthesis of anhydride-functionalized styrene-/butadiene random copolymers. The teachings of these patents are incorporated herein by reference. Other methods of preparing such adducts will be well-known to those skilled in the art.

In yet another embodiment of this invention, a functionalized elastomer is employed which is an adduct of an α,β-unsaturated carboxylic acid anhydride and a polymer of at least one conjugated diene. The diene polymer may be hydrogenated if desired, preferably to an extent such that less than 20 percent of the original unsaturation remains. The diene may be any hydrocarbon containing two conjugated double bonds such as 1,3-butadiene, which is the preferred diene. Examples of other suitable dienes include isoprene, 2,3-dimethyl-1,3-butadiene, chloroprene, 1,3-pentadiene, and the like. Mixtures of dienes may also be employed. Polymers of conjugated dienes which may be utilized include those containing a total of about 0.1 to 100 percent 1,2- and 3,4 microstructure content and about 0.1 to 99 percent 1,4-microstructure. It is preferred that the 1,2-microstructure content be from about 40 to 60 percent. Illustrative types of conjugated diene polymers which may be utilized in this embodiment include polybutadiene, polyisoprene, and natural rubber. "Ene"-type thermal grafting may be used to form anhydride-functionalized adducts of this type, as described in U.S. Pat. No. 4,427,828 (incorporated by reference). Other synthetic routes to such adducts will be apparent to those familiar with the art.

D. Linking Compound

The resin blends of this invention additionally contain as an essential component from about 0.01 to 5 weight percent (more preferably, from about 0.05 to 1.0 weight percent) of a linking compound. The linking compound may be any organic compound having at least two active hydrogen-containing functional groups selected from the group consisting of hydroxyl and amino. The linking compound can contain both hydroxyl and amino functional groups if desired. Preferably, the number average molecular weight of the linking compound is less than about 1000 and most preferably is less than about 500. Higher molecular weight linking compounds such as amino or hydroxy-functionalized polymers may be used provided their use does not result in compatibility problems in the polymer blend. In view of the fact that the linking compound is thought to promote compatibility between the main polymeric components of the blends of this invention by reacting to at least some extent with the anhydride groups of the anhydride-functionalized elastomer and the random styrenic copolymer, the active hydrogen-containing functional groups should not be sterically hindered or low in nucleophilicity. For this reason, the use of primary or secondary alcohols and primary amines is preferred over tertiary alcohols and secondary amines. Amines are preferred over alcohols because of their generally higher reactivity towards anhydride groups. The amino or hydroxyl groups are preferably separated by at least two carbon atoms (more preferably, at least four carbon atoms).

The exact chemical structure of the linking compound is not critical for the purposes of this invention, other than the requirement that at least two active hydrogen-containing groups be present. The linking compound may thus be any di- or polyhydroxy alkane, di- or polyhydroxyl aromatic compound, di- or polyhydroxy aromatic compound, di- or polyamino alkane, or dipolyamino aromatic compound. It is generally preferable for the linking compound to contain only two active-hydrogen containing groups. Mixtures of linking compounds may be employed. Aliphatic and aromatic alcohols and amines are generally suitable for use.

In a particularly preferred embodiment, the linking compound is an aliphatic linking compound having the general structure

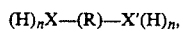

wherein R is an alkyl, aryl, or aralkyl radical containing from 2 to 20 carbon atoms, X and X' are the same or different and are independently oxygen or nitrogen, n is 1 if X is oxygen and 2 if X is nitrogen, n' is 1 if X' is oxygen and 2 if X' is nitrogen, and X and X' are separated by at least two carbon atoms. R may contain other functional groups such as ether, ketone, nitro, halo, sulfide, cyano, and other such groups non-reactive with anhydride. Preferably, —(R)— is a $(CH_2)_m$ group wherein m is an integer of from 4 to 20. Illustrative linking compounds include ethylene glycol, propylene glycol, 1,3-propanediol, 1,4-butanediol, 2,3-butanediol, 1,3-butanediol, 1,5-pentanediol, 1,4-pentanediol, 1,2-pentanediol, 2-ethyl-2-methyl-1,3-propanediol, 1,5-hexanediol, 1,6-hexanediol, 2,5-hexandiol, 1,8-octanediol, 2-ethyl-1,3-hexanediol, 1,2-octanediol, 2-ethyl-1,3-hexanediol, 1,2-octanediol, 1,10-decanediol, 1,12-dodecanediol, 1,14-tetradecanediol, 1,16-hexadecanediol, hydroquinone, resorcinol, cresol, 1,2-,1,3-,1,4-,1,5-,1,6-,2,3-,2,6-or 2,7-dihydroxy naphthalene, 1,4-cyclohexanediol, 1,4-cyclohexanedimethanol, 1,4-cyclo-octanediol, bisphenol A, bisphenol B, bisphenol F, 4,4'-biphenol, ethylenediamine, 1,3-diaminopropane, 1,2-diaminopropane, 2,3-diaminobutane, 1,3-diaminobutane, 1,5-diaminopentane, 1,4-diaminopentane, 1,2-diaminopentane, 2-ethyl-2-methyl-1,3-diaminopropane, 1,5-diaminopropane, 1,6-diaminohexane, 2,5-diaminohexane, 1,8-diaminooctane, 2-ethyl-1, 3-diaminohexane, 1,2-diaminooctane, 1,10-diaminodecane, 1,12-diaminododecane, 1,4-diaminotetradecane, 1,16-diaminohexadecane, 1,2-phenylenediamine, 1,3-phenylenediamine, 1,4-phenylenediamine, 1,5-diaminonaphthalene, 4,4'-methylenedianiline, 2,4'-methylenedianiline, 1,8-diaminonaphthalene, 1,4-diaminocyclohexane, 1,3-cyclohexane bis(methylamine), 1,5-,1,4-, or 1,6-diamino anthraquinone, 4,4'-ethylenedianiline, 4,4'-ethylene di-m-toluidine, 2,7-diaminofluorene, 1,7-diaminoheptane, 1,2-dianilinoethane, 1,8-diaminonaphthalene, 3,3'-diamino-N-methyl dipropylamine, 2,6-diaminopyridine, 2,4-diaminotoluene, 2,6-diaminotoluene, 2-,3-, or 4-aminophenol, 3-amino-1-propanol, 1-amino-2-propanol, 4-amino-1-butanol, 6-amino-1-hexanol, 2-aminobenzyl alcohol, 3-aminobenzyl alcohol, 4-amino-o-cresol, 2-amino-o-cresol, 1-amino-1-cyclopentane methanol, 2-(2-aminoethoxy)ethanol, 6-amino-1-hexanol, 3-(1-hydroxyethyl)aniline, 2-amino-1-phenylethanol, 1-aminomethyl-1-cyclohexanol, diethylene glycol, triethylene glycol, tetraethylene glycol, dipropylene glycol, tripropylene glycol, tetrapropylene glycol, 2-amino-1-methyl-1-propanol, 8-amino-2-naphthol, 5-amino-1-pentanol, 2-amino-phenethyl alcohol, 4-aminophenethyl alcohol, 3-($\alpha$-hydroxyethyl) aniline, $\alpha$-phenylglycinol, 2-(4-aminophenyl)ethylamine, 2-amino-1-propanol, and the like and mixtures thereof.

E. Additives

The resin blends of this invention may additionally contain any of the standard thermoplastic additives known in the art such as fillers, reinforcing agents, colorants, lubricants, anti-static agents, stabilizers, fire retardants, anti-oxidants, anti-blocking agents, and/or other compounding ingredients. Such additives may be added to the final resin composition or introduced during melt-blending of the individual components, for example.

Examples of fillers which may be blended with the resin compositions of this invention include, but are not limited to, mineral fillers such as calcium carbonate, dolomite, silicates, silicas, talc, koalin, mica, magnesium phosphate, barium sulfate, titanium oxide, and the like, organic fillers such as carbon black, and fibrous fillers such as glass fiber (including strands and chopped fiber), carbon fiber, graphite fiber, synthetic thermoplastic fiber (e.g., aliphatic polyamide, aromatic polyamide, polyethylene, polypropylene), ceramic fiber, and boron fiber. The weight ratio of resin to filler is preferably from about 0.5:1 to 20:1.

F. Methods of Preparing Thermoplastic Resin Composition

The blending of the crystalline propylene polymer, random styrenic copolymer, anhydride-functionalized elastomer, and linking compound components of the compositions of this invention may be performed in any manner that produces a compatibilized polyblend. "Compatibilized" in this context means that the thermoplastic resin composition produced is dimensionally stable and does not exhibit delamination upon molding and in subsequent use.

The preferred procedure is to intimately mix the components in the form of granules and/or powder in a high shear mixer at an elevated temperature. Intimate mixing may be accomplished by the use of extrusion compounding machines such as single or twin screw compounding extruders or thermoplastic extruders having preferably at least a 20:1 L/D ratio and a compression ratio of about 3 or 4:1. The polyblend may be either supplied directly to a molding machine or converted into pellet form for further processing.

The mixing temperature is selected in accordance with the particular components to be blended. For example, generally it will be desirable to select a melt blending temperature above the melting or softening point of the component having the highest melting or softening point, but below the temperature at which thermal degradation of any component becomes significant. Blending temperatures between about 190° C. and 330° C. are generally suitable.

A compatibilized polyblend composition is preferably produced in a two step process. In the first step, an intermediate blend is formed by melt-blending the crystalline propylene polymer, the anhydride-functionalized elastomer, and the linking compound. The melt-blending is preferably accomplished at a temperature of from about 150° C. to 300° C. The intermediate blend is then melt-blended with the random styrenic copolymer. For reasons which are not well understood, this two step procedure generally yields compositions having higher impact strength and better heat resistance than compositions prepared by combining all of the components in a single step. It is believed that melt-blending the anhydride-functionalized elastomer and the linking compound together with the propylene polymer allows the linking compound to react with the anhydride groups of the anhydride-functionalized elastomer and enables the hydroxy- or amine-functionalized elastomer which results to become well-dispersed in the propylene polymer. When the intermediate blend is then combined with the styrenic copolymer, the hydroxy- or amine-functionalized elastomer reacts with the anhydride groups of the styrenic copolymer. Uniform dispersion of the components is thereby achieved, resulting in a high degree of compatibilization and a minimum amount of cross-linking (i.e., reaction of each end of the linking compound with the same type of compound). It is preferred that one of the active hydrogen-containing functional groups reacts with a random styrenic copolymer chain while the other such group reacts with an anhydride-functionalized elastomer chain. Cross-linking may also be minimized by using a stoichiometric excess of active-hydrogen-containing functional groups relative to anhydride groups.

It is, of course, possible to use amine- or hydroxy-functionalized elastomers in the blends of this invention which are prepared by methods other than those described hereinabove. Such elastomers are then used in place of the linking compound and anhydride-functionalized elastomer. That is, rather than reaction-blending a linking compound and an anhydride-functionalized elastomer to obtain an amine- or hydroxy-functionalized elastomer in situ, an elastomer bearing anhydride-reactive amine or hydroxyl groups may be separately synthesized and then combined with the crystalline propylene polymer and random styrenic copolymer components of the blend. Preferably, the amine- or hydroxy-functionalized elastomer contains from about 1 to 50 milliequivalents of hydroxyl and/or amine functional groups per 100 grams of elastomer. Most preferably, from about 5 to 20 meq of active hydrogen is present in the elastomer.

For example, hydroxyl groups can be incorporated into the elastomeric polymer by grafting the elastomeric polymer with an ethylenically unsaturated hydroxyl-functionalized monomer such as 2-hydroxyethyl acrylate, 2-hydroxypropyl acrylate, 2-hydroxyethyl methacrylate, methallyl alcohol, a hydroxyl alkyl ester of an ethylenically unsaturated acid, 2-hydroxypropyl methacrylate, allyl alcohol, vinyl benzyl alcohol, hydroxylbutyl crotonate, di(2-hydroxyethyl)maleate, di(2-hydroxyethyl)fumarate, hydroxyethyl vinyl ether, diethylene glycol monovinyl ether, and the like. The introduction of primary or secondary amine groups may be accomplished through the use of the analogous ethylenically unsaturated amine-functionalized monomers (e.g., amino ethyl methacrylate). Alternatively, such monomers may be copolymerized with the other monomers comprising the elastomeric polymer at the time the elastomeric polymer is prepared. Free radical polymerization using a suitable initiator in a bulk, suspension, emulsion, or solution system is a particularly preferred technique for copolymerizations of this type. Yet another method for preparing suitable amine- or hydroxy-functionalized elastomers is to chemically modify the base elastomeric polymer. For example, an elastomeric polymer containing ethylenic unsaturation may be partially epoxidized and the epoxy groups then hydrolyzed. Alternatively, the sites of ethylenic unsaturation may be directly oxidized to 1,2-diol functionalities using a reagent such as osmium tetroxide, hydrogen peroxide, or an organic hydroperoxide. In yet another approach, a polymer incorporating masked amino or hydroxyl functional group-containing monomers can be treated to obtain active hydrogen functionalized elastomer.

Such methods will be well known to those skilled in the art. For example, an amine- or hydroxy-functionalized polybutadiene may be prepared as described in Japanese Kokai 65745/82. Butadiene is anionically polymerized and then reacted with either p-bromoaniline or ethylene oxide to yield amine- or hydroxy-functionalized polybutadiene. Alternatively, aminoethyl methacrylate is copolymerized with butadiene in order to obtain an amine-functionalized elastomer. The preparation of amino- and hydroxy-functionalized ethylene-propylene and ethylene-propylene-diene elastomers is described in U.S. Pat. Nos. 3,786,687, 3,761,458, 3,884,888, 4,423,196, 3,492,277, 4,721,752, 4,987,200 and 4,742,116 and EP 375,200 the teachings of which are incorporated herein by reference in their entirety.

In yet another synthetic approach to the blends of this invention, the linking compound is first reacted with the α,β-unsaturated dicarboxylic acid anhydride before the anhydride is reacted with the elastomeric polymer to form an adduct. Unsaturated half-acid amide, unsaturated half-acid ester, or unsaturated imide compounds containing amine or hydroxyl functional groups (hereinafter referred to as "anhydride derivatives") are produced when the linking compound and the α,β-unsaturated dicarboxylic acid anhydride are reacted. The anhydride derivatives are then combined with the base elastomeric polymer using the same procedures described previously for α,β-unsaturated dicarboxylic anhydride to yield amine- or hydroxy-functionalized elastomer adducts. These amine- or hydroxy-functionalized elastomer adducts are then combined with the crystalline propylene polymer and random styrenic copolymer components of the blends of this invention.

For example, a linking compound having the general structure

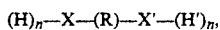

wherein R is an alkyl, aryl, or aralkyl radical containing from 2 to 20 carbon atoms, X and X' are the same or different and independently selected from the group consisting of oxygen and nitrogen, n is 1 if X is oxygen and 2 if X is nitrogen, n' is 1 if X' is oxygen and 2 if X' is nitrogen, and X and X' are separated by at least two carbon atoms may be reacted with an α,β-unsaturated dicarboxylic acid anhydride to yield the products illustrated below for maleic anhydride.

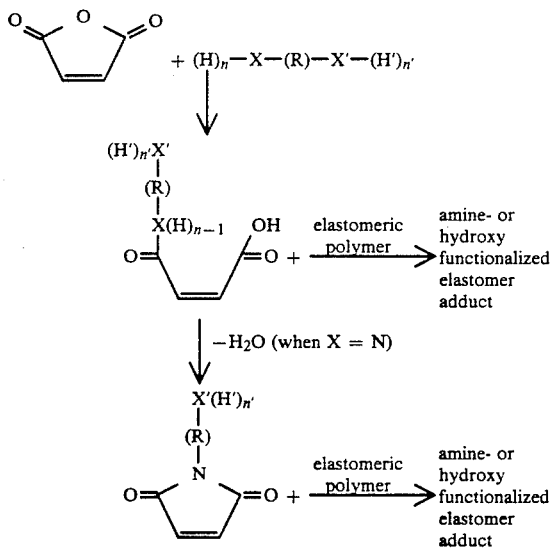

Specific examples of anhydride derivatives suitable for use in preparing amine- or hydroxy-functionalized elastomer adducts include maleimides prepared by reacting maleic anhydride with 1,4-phenyldiamine, 4-amino-phenol, ethylenediamine, 1,12-diaminododecane, and the like as well as half-acid esters prepared by reacting maleic anhydride with p-cresol, 1,6-hexanediol, 1,4-benzenedimethanol, 4-hydroxyphenethyl alcohol, and the like. Other such suitable anhydride derivatives will be apparent from the description of the useful α,β-unsaturated dicarboxylic anhydrides and linking compounds provided elsewhere in this specification.

Any of the known thermoplastic forming techniques may be used to shape the resin blends of this invention into final products These techniques include, but are not limited to, injection molding, extrusion, thermoforming, stamping, structural foam molding, extrusion blow molding, injecting blow molding, rotational molding, and the like. The compositions of this invention are particularly useful for the production of shaped parts by thermoforming, wherein a flat sheet of the resin is softened by heating and then shaped through the use of a mold and some combination of heat, pressure, vacuum, or mechanical assists. After cooling, the part retains the shape of the mold. A number of variations on this general technique are possible, including, for example, straight vacuum forming, drape forming, matched mold forming, pressure bubble plug assist vacuum forming, air slip forming, free forming, plug assist vacuum forming or trapped sheet contact heat pressure forming. Thermoforming can operate as part of an integrated system wherein an extruder produces a resin sheet which is immediately formed and trimmed while still warm. Crystalline olefin polymers such as polypropylene or ethylene-propylene copolymers have relatively sharp melting points and consequently have relatively narrow processing windows. That is, once the sheet of olefin polymer is heated to a thermoformable temperature, the sheet will not support its own weight and will readily sag. This tendency to sag results in difficulties in handling the softened sheet during the molding step. In contrast, the resin blends of this invention have much wider processing windows and thus are better suited to thermoforming applications.

From the foregoing description, one skilled in the art can readily ascertain the essential characteristics of this invention, and, without departing from the spirit and scope thereof, can make various changes and modifications of the invention to adapt it to various usages, conditions, and embodiments.

The following examples further illustrate the moldable polyblends of this invention, but are not limitative of the invention in any manner whatsoever.

EXAMPLES 1-11

A. Description of Polyblend Components

I. Crystalline Propylene Polymer A-1 is "ESCORENE 1042" polypropylene (a propylene homopolymer having a melt flow rate of 1.9 g/10 min., sold by Exxon Chemical).

Crystalline Propylene Polymer A-2 is "MARLEX HGH-050" polypropylene (a propylene homopolymer having a melt flow rate of 5.0 g/10 min., sold by Phillips).

Crystalline Propylene Polymer A-3 is "TENITE P64MZ-007" polypropylene (a propylene copolymer having a melt flow rate of 8.0 g/10 min., sold by Eastman).

Crystalline Propylene Polymer A-4 is "FINA 3662" polypropylene (a propylene homopolymer having a melt flow rate of 12 g/10 min., sold by Fina Oil).

Crystalline Propylene Polymer A-5 is "NORCHEM NPP84004HJ" polypropylene (a propylene copolymer having a melt flow rate of 3 g/10 min., sold by Quantum Chemical Corp.

Crystalline Propylene Polymer A-6 is "UNIPOL 5C04Z" polypropylene (a propylene homopolymer having a melt flow rate of 20 g/10 min., sold by Shell Chemical Company).

Crystalline Propylene Polymer A-7 is "PRO-FAX 7523" polypropylene (a propylene copolymer having a melt flow rate of 4 g/10 min., sold by Himont).

II. Random Styrenic

Random Styrenic Copolymer B-1 is "DYLARK 132" resin (a crystalline styrene/maleic anhydride copolymers sold by ARCO Chemical Company containing about 5 weight percent maleic anhydride and having a melt flow rate of about 1.6 g/10 min.).

Random Styrenic Copolymer B-2 is a crystalline styrene/maleic anhydride copolymer containing about 2 weight percent maleic anhydride.

Random Styrenic Copolymer B-3 is "DYLARK 232" resin (a crystalline styrene/maleic anhydride copolymer sold by ARCO Chemical Company containing about 8 weight percent maleic anhydride and having a melt flow rate of about 1.6 g/10 min.).

Random Styrenic Copolymer B-4 is a rubber-modified styrene/maleic anhydride copolymer containing about 8 weight percent maleic anhydride and about 15 weight percent of a graded styrene/butadiene block copolymer rubber having a melt flow value of about 0.9 g/10 min. and prepared in accordance with the procedures of U.S. Pat. No. 3,919,354.

Random Styrenic Copolymer B-5 is a styrene/maleic anhydride/acrylonitrile terpolymer containing 70 weight percent styrene, 10 weight percent maleic anhydride, and 20 weight percent acrylonitrile prepared in accordance with U.S. Pat. No. 4,223,096.

Random Styrenic Copolymer B-6 is a styrene/maleic anhydride/methyl methacrylate terpolymer containing 68 weight percent styrene, 15 weight percent maleic anhydride, and 17 weight percent methyl methacrylate and additionally containing 14 parts by weight SBR (styrene-butadiene rubber) per 100 parts terpolymer prepared in accordance with U.S. Pat. No. 4,341,695.

Random Styrenic Copolymer B-7 is a crystalline p-methylstyrene/citraconic anhydride copolymer containing about 3 weight percent citraconic anhydride prepared in accordance with the procedures of U.S. Pat. No. 2,989,517.

Random Styrenic Copolymer B-8 is a styrene/maleic anhydride/methacrylic acid terpolymer containing about 15 weight percent maleic anhydride and 10 weight percent methacrylic acid prepared in accordance with Example 9 of Jpn. Kokai 61-255,913.

III. Anhydride-Functionalized Elastomers

Anhydride-Functionalized Elastomer C-1 is "ROYALTUF 465A", a maleated-EPDM containing about 0.7 weight percent maleic anhydride sold by Uniroyal.

Anhydride-Functionalized Elastomer C-2 is "ROYALTUF 465", a maleated-EPDM rubber containing about 1.2 weight percent maleic anhydride sold by Uniroyal.

Anhydride-Functionalized Elastomer C-3 is "KRATON FG1901X", a maleated hydrogenated styrene/butadiene block copolymer containing 2 weight percent maleic anhydride and 28 weight percent polymerized styrene sold by Shell Chemical.

Anhydride-Functionalized Elastomer C-4 is a maleic anhydride-functionalized polybutadiene prepared in accordance with Example 1 of U.S. Pat. No. 4,427,828, having a weight average molecular weight of 170,000 and a maleic anhydride content of about 5 weight percent.

Anhydride-Functionalized Elastomer C-5 is a maleic anhydride-functionalized ethylene-propylene rubber prepared in the same manner as Polymer D-1 of Japanese Kokai 66249/88 and containing about 0.5 weight percent maleic anhydride.

Anhydride-Functionalized Elastomer C-6 is a maleic anhydride-functionalized styrene/isoprene/styrene block copolymer prepared in accordance with Example 5 of U.S. Pat. No. 4,292,414 containing 15 weight percent styrene and about 3.2 weight percent grafted maleic anhydride.

Anhydride-Functionalized Elastomer C-7 is a maleic anhydride functionalized EPDM tetrapolymer rubber prepared in accordance with Example 13 of U.S. Pat. No. 4,010,223 having a maleic anhydride content of about 2.2 weight percent. The monomer composition of the EPDM tetrapolymer is 70 weight percent ethylene, 23 weight percent propylene, 6.75 weight percent 1,4-hexadiene, and 0.25 weight percent 2,5-norbornadiene.

IV. Linking Compounds

Linking Compound D-1 is 1,12-diaminododecane.
Linking Compound D-2 is 4-aminophenol.
Linking Compound D-3 is 4,4'-methylenedianiline.
Linking Compound D-4 is bisphenol A.
Linking Compound D-5 is 6-amino-1-hexanol.
Linking Compound D-6 is 4,4'-bisphenol.
Linking Compound D-7 is 4-amino-phenethyl alcohol.

B. Blending Procedure

Polyblends were prepared using a two step procedure. In the first step, the crystalline propylene polymer, anhydride-functionalized elastomer, and linking compound components of the polyblend were melt-blended using an Egan 1.5" single screw/single vent extruder (L/D - 24/1) and the following conditions:

RPM 165
Vacuum: 50 torr
Screw Type: Stratablend screw
Hopper Throat: Water-cooled

| Zone | Temp (°F.) |
|---|---|
| 1 | 420 |
| 2 | 440 |
| 3 | 460 |
| 4 | 460 |
| Die | 470 |

The intermediate mixture thus obtained was then melt-blended in a second step with the random styrenic copolymer using the same equipment and conditions as described above with the exception that the temperature was as follows:

| Zone | Temp (°F.) |
|---|---|
| 1 | 470 |
| 2 | 470 |
| 3 | 470 |
| 4 | 470 |

Molded samples of the resin blends for testing of physical properties were obtained by injection molding using a Reed 5 oz. 100 ton injection molding machine and the following conditions;

| Zone | | |
|---|---|---|
| Zone 1 | 470 | F. |
| Zone 2 | 470 | F. |
| Zone 3 | 470 | F. |
| Nozzle | 465 | F. |
| Inj. Pressure | 650 | psi |
| Hold Pressure | 450 | psi |
| Back Pressure | 100 | psi |
| Mold Close Time | 454 | sec |
| Mold Temp. | 120 | F. |
| Screw Speed | 60 | rpm |
| Inj. Forward Setting | 8 | sec |
| Mold Open | 8 | sec |
| Mold Close | 45 | sec |
| Cushion | ¼ | inches |
| Shot Size | 4⅛ | inches |
| Melt Temp. | 480 | F. |

-continued

| Zone | Temp (°F.) |
|---|---|
| Die | 470 |

The physical properties of the molded samples were measured using standard ASTM methods (Table I).

Example 1 used 56 parts by weight crystalline propylene polymer A-1, 20 parts by weight random styrenic copolymer B-1, 24 parts by weight anhydride-functionalized elastomer C-1, and 0.35 parts by weight linking compound D-1. The resin blend of Example 2 had the same composition as the blend of Example 1 with the exception that random styrenic copolymer B-2 was used in place of random styrenic copolymer B-1. In both Example 1 and 2, the impact properties of the blend were improved considerably as compared to the unblended crystalline propylene polymer (Comparative Example 3). At the same time, however, the heat resistance of the blend was not significantly affected. Each blend was readily processed to produce moldings having excellent appearance and uniformity. Comparative Example 4 shows the physical properties of the intermediate blend obtained in the preparation of the blends of Examples 1 and 2. This intermediate blend contained only the crystalline propylene polymer A-1, the anhydride-functionalized elastomer C-1, and linking compound D-1. While the intermediate blend had reduced brittleness as compared to the crystalline propylene polymer A-1 alone, the composition had unsatisfactory heat resistance. Thus, it may be seen that adding random styrenic copolymer B-1 or B-2 to the blend greatly enhanced the heat resistance while still providing a ductile (non-brittle) compatibilized resin. The high degree of compatibility between the components of the blends of this invention was especially surprising in view of the complete immiscibility of crystalline propylene polymers and styrene/maleic anhydride copolymers.

To illustrate the use of differing proportions of various crystalline propylene polymers, random styrenic copolymers, anhydride-functionalized elastomers, and linking compounds within the scope of this invention, resin blends having the compositions shown in Table II as Examples 5–11 are prepared using the procedures described in Examples 1 and 2. The blends are expected to exhibit the beneficial impact and heat distortion resistance properties attainable by this invention when formed into molded articles.

TABLE I

| | Example No. | | | |
|---|---|---|---|---|
| | 1 | 2 | 3* | 4* |
| DTUL (°F.; ¼"; 264 psi) (unannealed) | 127 | 124 | 131 | 111 |
| Notched Izod (ft. · lb/in) | 5.4 | 4.0 | 0.8 | 9.5 |
| Penetration Impact | | | | |
| Total Energy (ft · lbs) | 10.6 | 9.5 | 3.0 | 24.5 |
| Max. Load (lbs) | 310 | 310 | 230 | 480 |

*comparative example

TABLE II

| RESIN BLEND COMPONENTS (parts by weight) | | | | |
|---|---|---|---|---|
| Example | Crystalline Propylene Polymers | Random Styrenic Copolymers | Anhydride-Functionalized Elastomer | Linking Compound |
| 6 | A-2 (75) | B-3 (15) | C-2 (9.8) | D-2 (0.2) |
| 7 | A-3 (30) | B-4 (35) | C-3 (30.5) | D-3 (4.5) |
| 8 | A-4 (40) | B-5 (40) | C-4 (19) | D-4 (1.0) |
| 9 | A-5 (50) | B-6 (20) | C-5 (29.25) | D-5 (0.75) |
| 10 | A-6 (60) | B-7 (25) | C-6 (12.5) | D-6 (2.5) |
| 11 | A-7 (70) | B-8 (10) | C-7 (18.5) | D-7 (1.5) |

EXAMPLES 12–19

These examples demonstrate the use of other types of amino- or hydroxyl-functionalized elastomers in blends with crystalline propylene polymers and random styrenic copolymers. Polypropylene ("ESCORENE 1042"; 55 parts by weight) and styrene/maleic anhydride copolymer ("DYLARK 132"; 25 parts by weight) are melt-blended with the following amino- or hydroxyl-functionalized elastomers (20 parts by weight) using the same conditions as employed in the second step of the procedure described in Examples 1–11.

Example 12: an EPDM elastomeric polymer modified with hydroxyl groups by grafting 2-hydroxyethyl methacrylate onto the elastomeric polymer in accordance with Examples 1–4 of U.S. Pat. No. 4,742,116.

Example 13: an EPDM elastomeric polymer modified with hydroxyl groups by grafting 2% allyl alcohol onto the elastomeric polymer in accordance with Examples 5–7 of U.S. Pat. No. 4,742,116.

Example 14: a polybutadiene elastomeric polymer having a molecular weight of 43,000 modified with amino groups by quenching an anionic polymerization of butadiene with p-bromo aniline in accordance with the procedure described in Jpn. Kokai 65745/82.

Example 15: a polybutadiene elastomeric polymer modified by grafting aminoethyl methacrylate onto the elastomeric polymer in accordance with the procedure described in Jpn. Kokai 65745/82.

Example 16: an ethylene/propylene/1,4-hexadiene/2-aminomethyl-5-norbornene tetrapolymer containing ca. 3.9 weight % 2-aminomethyl-5-norbornene prepared in accordance with Example 15 of U.S. Pat. No. 3,884,888.

Example 17: an ethylene/propylene/1,4-hexadiene/5-hexen-1-ol tetrapolymer containing ca. 2.1 weight % 5-hexen-1-ol prepared in accordance with Example 11 of U.S. Pat. No. 3,884,888.

Example 18: an ethylene/propylene/5-norbornene-2-methanol terpolymer containing ca. 41.5 weight % ethylene prepared in accordance with Example 18-3 of U.S. Pat. No. 4,987,200.

Example 19: an ethylene/propylene/5-norbornene-2-methyl-(N-n-butyl)amine terpolymer containing ca. 45.8 weight percent ethylene prepared in accordance with Example 19 of U.S. Pat. No. 4,987,200.

I claim:

1. A resin blend comprising:
   (a) from about 25 to 80 weight percent of a crystalline propylene polymer;
   (b) from about 5 to 40 weight percent of a random styrenic copolymer comprised of
      (i) from about 50 to 99.5 weight percent of a vinyl aromatic monomer;
      (ii) from about 0.5 to 30 weight percent of a first $\alpha,\beta$-unsaturated dicarboxylic acid anhydride; and
   (c) a functionalized elastomer comprised of a base elastomeric polymer and at least one pendent active hydrogen-containing functional group selected from the group consisting of amino and hydroxyl, wherein said base elastomeric polymer is selected from the group consisting of
      (i) random copolymers of ethylene, a $C_3$ to $C_6$ olefin, and a diene;
      (ii) conjugated diene polymers and hydrogenated derivatives thereof;
      (iii) block and random copolymers of vinyl aromatic monomers and conjugated dienes and hydrogenated derivatives thereof; and
      (iv) random copolymers of ethylene and a $C_3$ to $C_6$ olefin.

2. The resin blend of claim 1 wherein the functionalized elastomer is derived by reacting an anhydride-functionalized elastomer which is an adduct of the base electomeric polymer and a second $\alpha,\beta$-unsaturated dicarboxylic acid anhydride with a linking compound having at least two active hydrogen-containing functional groups selected from the group consisting of hydroxyl and amino.

3. A resin blend comprising:
   (a) from about 25 to 80 weight percent of a crystalline propylene polymer;
   (b) from about 5 to 40 weight percent of a random styrenic copolymer comprised of
      (i) from about 50 to 99.5 weight percent of a vinyl aromatic monomer;
      (ii) from about 0.5 to 30 weight percent of a first $\alpha,\beta$-unsaturated dicarboxylic acid anhydride; and
   (c) from about 2 to 40 weight percent of an anhydride-functionalized elastomer which is an adduct of a second $\alpha,\beta$-unsaturated dicarboxylic acid anhydride and an elastomeric polymer selected from the group consisting of
      (i) random copolymers of ethylene, a $C_3$ to $C_6$ olefin, and a diene;
      (ii) conjugated diene polymers and hydrogenated derivatives thereof;
      (iii) block and random copolymers of vinyl aromatic monomers and conjugated dienes and hydrogenated derivatives thereof; and
      (iv) random copolymers of ethylene and a $C_3$ to $C_6$ olefin; and
   (d) from about 0.01 to 5 weight percent of a linking compound having at least two active hydrogen-containing functional groups selected from the group consisting of hydroxyl and amino.

4. The resin blend of claim 3 wherein the crystalline propylene polymer is selected from the group consisting of crystalline propylene homopolymers, crystalline propylene-ethylene copolymers, impact-modified crystalline propylene homopolymers, impact-modified crystalline propylene-ethylene copolymers, and mixtures thereof.

5. The resin blend of claim 3 wherein the vinyl aromatic monomer is styrene.

6. The resin blend of claim 3 wherein the first $\alpha,\beta$-unsaturated dicarboxylic acid anhydride is maleic anhydride.

7. The resin blend of claim 3 wherein the second $\alpha,\beta$-unsaturated dicarboxylic acid anhydride is maleic anhydride.

8. The resin blend of claim 3 wherein the elastomeric polymer is a random copolymer of ethylene, a $C_3$ to $C_6$ olefin, and a diene.

9. A resin blend comprising:
   (a) from about 25 to 80 weight percent of a crystalline propylene polymer;
   (b) from about 5 to 40 weight percent of a random styrenic copolymer of
      (i) from about 70 to 99.5 weight percent of a vinyl aromatic monomer;
      (ii) from about 0.5 to 30 weight percent of a first $\alpha,\beta$-unsaturated dicarboxylic acid anhydride;
   (c) from about 2 to 40 weight percent of an anhydride-functionalized elastomer comprising an adduct of a second $\alpha,\beta$-unsaturated dicarboxylic acid anhydride and an elastomeric polymer selected from the group consisting of
      (i) random copolymers of ethylene, a $C_3$ to $C_6$ olefin, and, optionally, a non-conjugated diene;
      (ii) conjugated diene polymers and hydrogenated derivatives thereof; and
      (iii) block and random copolymers of a second vinyl aromatic monomer and a conjugated diene and hydrogenated derivatives thereof; and
   (d) from about 0.01 to 5 weight percent of a linking compound having two active hydrogen containing functional groups selected from the group consisting of amino and hydroxyl and having a number average molecular weight of less than about 500.

10. The resin blend of claim 9 wherein the adduct contains from about 0.1 to 5 weight percent of the second $\alpha,\beta$-unsaturated dicarboxylic acid anhydride.

11. The resin blend of claim 9 wherein the random styrenic copolymer is a copolymer of styrene and maleic anhydride.

12. The resin blend of claim 9 wherein the random styrenic copolymer is rubber-modified.

13. The resin blend of claim 9 wherein the second $\alpha,\beta$-unsaturated dicarboxylic acid anhydride is maleic anhydride.

14. The resin blend of claim 9 wherein the elastomeric polymer is a random copolymer of ethylene, a $C_3$ to $C_6$ olefin, and the non-conjugated diene is selected from the group consisting of 1,4-hexadiene, 5-ethylidene-2-norbornene, and dicyclopentadiene.

15. The resin blend of claim 9 wherein the linking compound has the general structure

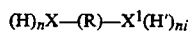

wherein R is an alkyl, aryl, or aralkyl radical containing from 2 to 20 carbon atoms, X and $X^1$ are the same or different and are independently oxygen or nitrogen, n is 1 if X is oxygen and 2 if X is nitrogen, and n: is 1 if $X^1$ is oxygen and 2 if $X^1$ is nitrogen.

16. A resin blend comprising
(a) from about 40 to 70 weight percent of a crystalline propylene polymer selected from the group consisting of crystalline propylene homopolymers, crystalline propylene-ethylene copolymers, and mixtures thereof;
(b) from about 10 to 30 weight percent of a random styrenic copolymer of from about 90 to 99 weight percent styrene and from about 1 to 10 weight percent maleic anhydride;
(c) from about 15 to 35 weight percent of an anhydride-functionalized elastomer comprising an adduct of maleic anhydride and an elastomeric polymer selected from the group consisting of:
  (i) random copolymers of ethylene, propylene, and, optionally, a non-conjugated diene selected from the group consisting of 1,4-hexadiene, 5-ethylidene-2-norbornene, and dicyclopentadiene;
  (ii) butadiene polymers and hydrogenated derivatives thereof; and
  (iii) block and random copolymers of styrene and butadiene and hydrogenated derivatives thereof;
wherein the adduct contains from about 0.1 to 5 weight percent maleic anhydride; and
(d) from about 0.05 to 1.0 weight percent of an aliphatic diamine having a number average molecular weight of less than about 300.

17. The resin blend of claim 16 wherein the random styrenic copolymer is rubber-modified by polymerizing the styrene and maleic anhydride in the presence of at least one conjugated diene rubber.

18. The resin blend of claim 16 wherein the aliphatic diamine has the general structure $$H_2N-(CH_2)_m-NH_2$$

wherein m is an integer of from 4 to 20.

19. The resin blend of claim 16 wherein the elastomeric polymer is a random copolymer of from about 40 to 90 mole percent ethylene, from about 2.5 to 59.9 mole percent propylene, and from about 0.1 to 7.5 mole percent of the non-conjugated diene.

20. The resin blend of claim 16 wherein the adduct contains from about 0.5 to 2 weight percent maleic anhydride.

* * * * *